US012647164B2

(12) United States Patent
Hassan

(10) Patent No.: US 12,647,164 B2
(45) Date of Patent: Jun. 2, 2026

(54) AREA-EFFICIENT POWER DETECTION SUBSYSTEM FOR PHASED ARRAY TRANSMITTER

(71) Applicant: QUALCOMM Incorporated, San Diego, CA (US)

(72) Inventor: Muhammad Hassan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 71 days.

(21) Appl. No.: 18/610,461

(22) Filed: Mar. 20, 2024

(65) Prior Publication Data

US 2025/0300706 A1    Sep. 25, 2025

(51) Int. Cl.
H04B 7/06      (2006.01)
H04B 1/18      (2006.01)
H04B 1/40      (2015.01)

(52) U.S. Cl.
CPC ............. H04B 7/0617 (2013.01); H04B 1/18 (2013.01); H04B 1/40 (2013.01)

(58) Field of Classification Search
CPC .......... H04B 7/0617; H04B 1/40; H04B 1/18
USPC ........................................ 375/295
See application file for complete search history.

(56) References Cited

U.S. PATENT DOCUMENTS 4,874,999 A  *  10/1989  Kuwabara ................ G05B 7/02
                                              318/610
11,637,581 B2     4/2023  Mishra et al.

11,656,254 B2     5/2023  Bellaouar et al.
2014/0050474 A1   2/2014  Cui et al.
2017/0294951 A1  10/2017  Weissman et al.
2022/0311460 A1*  9/2022  Azin ........................ H04B 1/04
2023/0208370 A1   6/2023  Abouzied et al.
2023/0276380 A1   8/2023  Liu et al.

FOREIGN PATENT DOCUMENTS

CN         218470966 U    2/2023
EP          2756549 B1    9/2018

OTHER PUBLICATIONS

International Search Report and Written Opinion—PCT/US2025/019992—ISA/EPO—Jul. 4, 2025.

* cited by examiner

*Primary Examiner* — Leila Malek

(74) *Attorney, Agent, or Firm* — Harrity & Harrity LLP/Qualcomm Incorporated

(57)              ABSTRACT

In some aspects, an apparatus may comprise multiple power coupling circuits that are each coupled between a respective power amplifier and a respective antenna element in a phased array, each power coupling circuit configured to generate a current proportional to an output power of the respective power amplifier. The apparatus may comprise a shared transimpedance amplifier (TIA) coupled to the multiple power coupling circuits, wherein the shared TIA comprises an input to receive, from the multiple power coupling circuits, the respective generated currents and an output to provide an analog signal indicating a value of the respective generated currents received from the multiple power coupling circuits. The apparatus may comprise an analog-to-digital converter (ADC) that comprises an input coupled to the output from the shared TIA and an output configured to provide a digital signal indicating the output powers from the power amplifiers. Numerous other aspects are described.

18 Claims, 8 Drawing Sheets

400

500

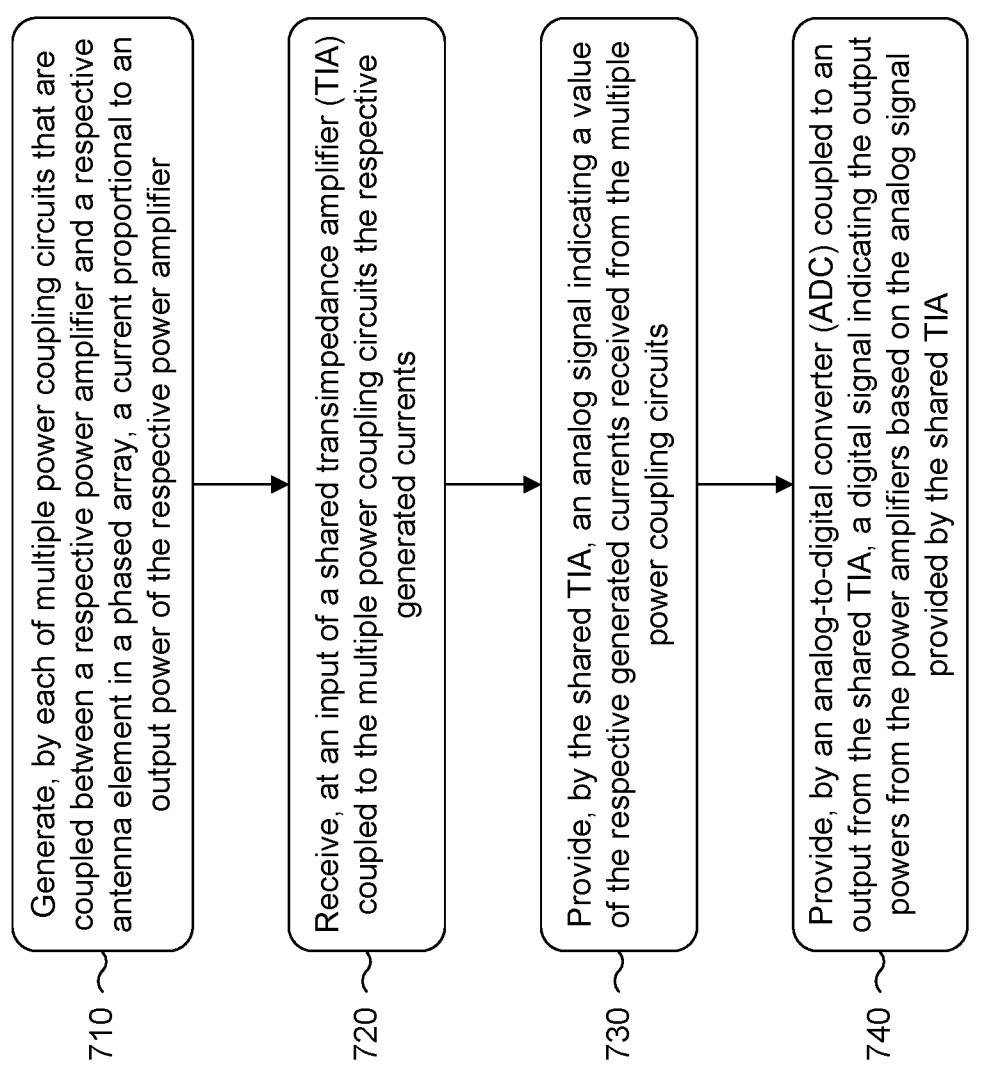

700

710   Generate, by each of multiple power coupling circuits that are coupled between a respective power amplifier and a respective antenna element in a phased array, a current proportional to an output power of the respective power amplifier 720   Receive, at an input of a shared transimpedance amplifier (TIA) coupled to the multiple power coupling circuits the respective generated currents 730   Provide, by the shared TIA, an analog signal indicating a value of the respective generated currents received from the multiple power coupling circuits 740   Provide, by an analog-to-digital converter (ADC) coupled to an output from the shared TIA, a digital signal indicating the output powers from the power amplifiers based on the analog signal provided by the shared TIA

FIG. 7

AREA-EFFICIENT POWER DETECTION SUBSYSTEM FOR PHASED ARRAY TRANSMITTER

FIELD OF THE DISCLOSURE

Aspects of the present disclosure generally relate to wireless transmitters and, for example, an area-efficient power detection subsystem for a phased array transmitter.

BACKGROUND

Wireless communication devices typically include a transceiver or transmitter to transmit a radio frequency (RF) signal to another wireless communication device, such as a network node or a user equipment (UE). For improved transmission gain, the transceiver or transmitter may include a set of transmit chains that are coupled to a respective set of antennas (e.g., an antenna array). The transmit chains may be configured to achieve beamforming by the antenna array such that the transmission gain in a particular direction is significantly increased, and such that the transmission gain in other directions is significantly reduced. For example, the direction in which the transmission gain is maximized may point substantially toward a destination wireless communication device that is intended to receive the transmitted RF signal.

SUMMARY

In some implementations, an apparatus includes multiple power coupling circuits that are each coupled between a respective power amplifier and a respective antenna element in a phased array, each power coupling circuit configured to generate a current proportional to an output power of the respective power amplifier; a shared transimpedance amplifier (TIA) coupled to the multiple power coupling circuits, wherein the shared TIA comprises: an input to receive, from the multiple power coupling circuits, the respective generated currents; and an output to provide an analog signal indicating a value of the respective generated currents received from the multiple power coupling circuits; and an analog-to-digital converter (ADC) that comprises an input coupled to the output from the shared TIA and an output configured to provide a digital signal indicating the output powers from the power amplifiers.

In some implementations, a method includes generating, by each of multiple power coupling circuits that are coupled between a respective power amplifier and a respective antenna element in a phased array, a current proportional to an output power of the respective power amplifier; receiving, at an input of a shared TIA coupled to the multiple power coupling circuits the respective generated currents; providing, by the shared TIA, an analog signal indicating a value of the respective generated currents received from the multiple power coupling circuits; and providing, by an ADC coupled to an output from the shared TIA, a digital signal indicating the output powers from the power amplifiers based on the analog signal provided by the shared TIA.

In some implementations, an apparatus includes a plurality of power coupling means, each provided between a respective power amplifier and a respective antenna element in a phased array, for generating a current proportional to an output power of the respective power amplifier; means for providing an analog signal indicating a value of the respective generated currents, wherein the means for providing the analog signal is shared by the plurality of power coupling means; and means for providing a digital signal indicating the output powers from the power amplifiers based on the analog signal.

Aspects generally include an apparatus, a method, a system, a wireless communication device, a transceiver, a transmitter, and/or a circuit, as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating a flowchart of an example process associated with an area-efficient power detection subsystem for a phased array transmitter, in accordance with the present disclosure.

DETAILED DESCRIPTION

Figure 1:
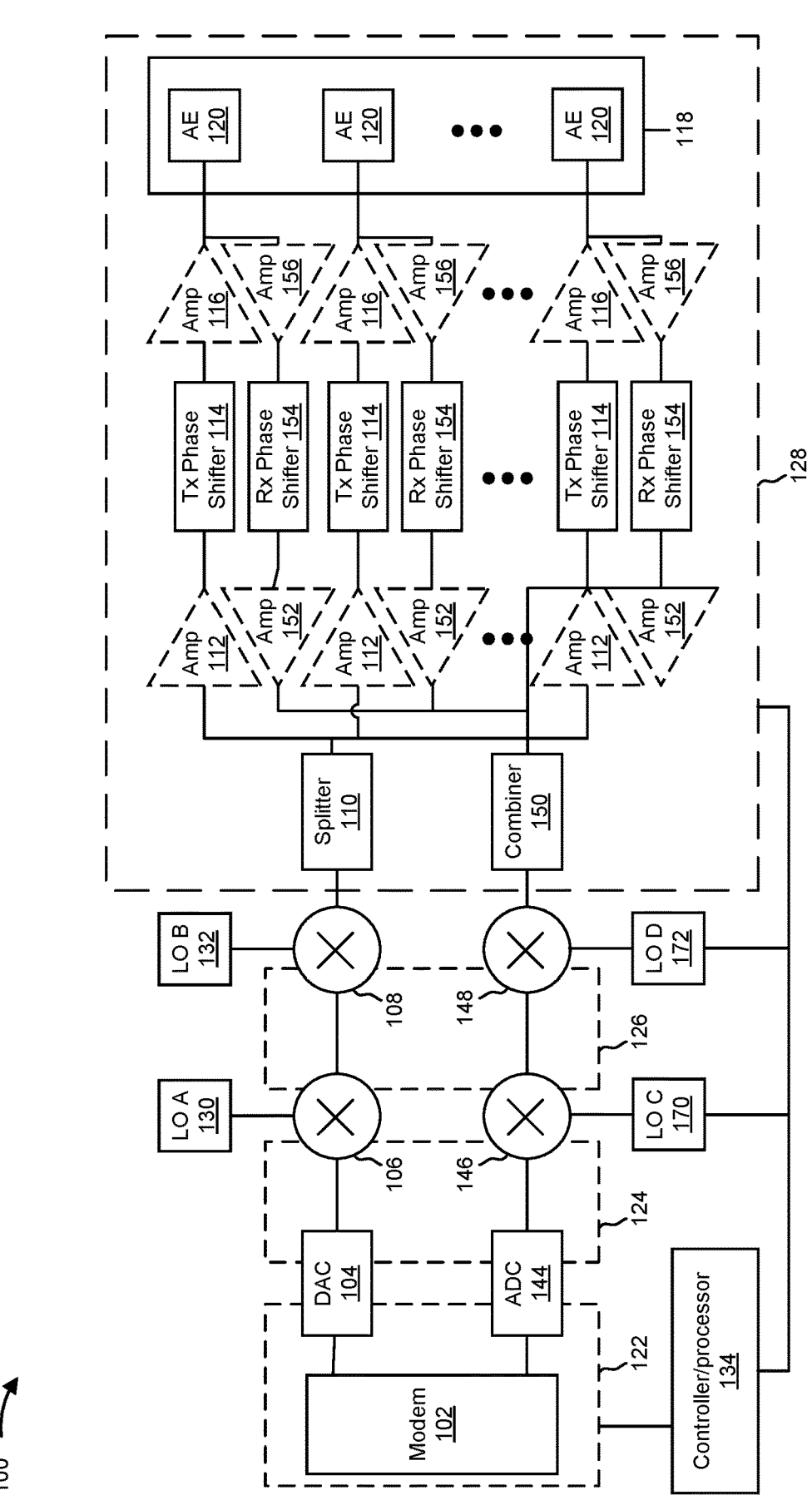
FIG. 1 is a diagram illustrating an example transceiver architecture that supports beamforming, in accordance with the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art.

One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

In a wireless transceiver or transmitter that includes multiple antenna elements (e.g., to support beamforming to maximize gain in a particular direction and/or to minimize gain in other directions), each transmit chain typically includes a power amplifier to amplify power of a signal to be transmitted by a corresponding antenna element such that a destination wireless communication device can successfully receive and process the transmitted signal. However, the power of the transmit signal at the output of the power amplifier is generally subject to one or more limitations (e.g., to prevent damage to the power amplifier). Furthermore, in some cases, there may be governmental or regulatory constraints (e.g., maximum permissible exposure (MPE) limits) that restrict the maximum total output signal power of the transmitter for safety and/or interference control. Accordingly, in order to protect the power amplifiers from damage and/or satisfy governmental or regulatory constraints, a wireless transceiver or transmitter may include a power detection subsystem to measure and control a total radiated power (TRP) of the wireless transceiver or transmitter.

For example, in a wireless transceiver or transmitter, a power detection subsystem typically includes various power detectors and one or more processors, controllers, circuits, or other devices that measure and adjust the TRP of the wireless transceiver or transmitter (e.g., in a servo manner). For example, in a wireless transceiver or transmitter with multiple antenna elements that are each driven (e.g., powered by) a corresponding power amplifier, a typical power detection subsystem includes a respective power detector coupled between each power amplifier and corresponding antenna element, such that each power detector (e.g., implemented using diode detectors, log detectors, peak detectors, or other suitable circuitry) samples a portion of a radio frequency (RF) signal passing from the power amplifier to the antenna element (e.g., via a coupler or other suitable techniques) and converts the sampled portion of the RF signal into a voltage or current that indicates or is otherwise representative of the power level of the RF signal (e.g., by rectifying and filtering the sampled RF signal to generate a corresponding analog signal, which could be a voltage or current proportional to the power level of the RF signal). The detected power level information may then be used by the wireless transceiver or transmitter to control or adjust one or more facets of the operation of the wireless transceiver, such as adjusting the gain of the power amplifiers to prevent damage to the power amplifiers or satisfy governmental or regulatory constraints, enable automatic gain control (AGC), or manage power levels to ensure efficient transmission and reception. However, because power detection subsystems typically include power detection hardware that is replicated for each antenna element and corresponding power amplifier, the power detection hardware tends to occupy significant area in a wireless communication device and increases device costs due to the large number of components needed to implement the power detection subsystem.

Various aspects relate generally to a power detection topology in which one or more power detection hardware elements that are typically replicated for each power amplifier and corresponding antenna element are shared among multiple power amplifiers and corresponding antenna elements. For example, in some aspects, a wireless transceiver or transmitter may include one or more modules or integrated circuits (ICs), where each module or IC includes multiple power amplifiers that are each coupled to a respective antenna element in a phased array. Accordingly, the power detection topology may include, for each of the one or more modules or ICs, multiple power coupling circuits that are each coupled between a respective power amplifier and a respective antenna element. In some aspects, as described herein, each power coupling circuit may be configured to generate a current proportional to an output power of the respective power amplifier (e.g., using a squaring or filtering circuit). Furthermore, the power detection topology may include, for each module or IC, a shared transimpedance amplifier (TIA) coupled to the multiple power coupling circuits, where the shared TIA may receive the currents generated by the multiple power coupling circuits and output an analog signal indicating a value of the generated currents received from the multiple power coupling circuits (e.g., a summed value when more than one current is received from the power coupling circuits). Accordingly, an analog-to-digital converter (ADC) may receive the analog signal from the shared TIA and output a digital signal indicating the output powers from the power amplifiers. The digital signal may then be provided to a processor, circuit, or other device that measures and adjusts the TRP of the wireless transceiver or transmitter based on the digital signals output by the ADC associated with each module or IC.

Particular aspects of the subject matter described in this disclosure can be implemented to realize one or more of the following potential advantages. In some examples, by sharing one or more hardware elements of the power detection subsystem among multiple transmit paths (e.g., multiple power amplifiers and corresponding antenna elements), the area that the power detection subsystem occupies within the wireless transceiver or transmitter may be significantly reduced. In this way, the described techniques may increase the available area in the wireless transceiver or transmitter, where the available area can then be used for other efficiency enhancement techniques such as antenna tuning, power combining, or the like. Furthermore, by sharing one or more hardware elements of the power detection subsystem among multiple transmit paths, the total number of hardware elements forming the power detection subsystem is significantly reduced, which reduces device costs.

FIG. 1 is a diagram illustrating an example transceiver architecture 100 that supports beamforming (e.g., for millimeter wave (mmW) communications), in accordance with the present disclosure. In some aspects, architecture 100 may be implemented in a transmitting device (e.g., a first wireless communication device, user equipment (UE), or network node) and/or a receiving device (e.g., a second wireless communication device, UE, or network node).

Broadly, FIG. 1 illustrates example hardware components of a wireless communication device in accordance with certain aspects of the disclosure. The illustrated components may be used for antenna element selection and/or for beamforming for transmission of wireless signals. There are numerous architectures for antenna element selection and implementing phase shifting, only one example of which is illustrated in FIG. 1. The architecture 100 includes a modem (modulator/demodulator) 102, a digital to analog converter (DAC) 104, a first mixer 106, a second mixer 108, and a splitter 110. The architecture 100 also includes multiple first amplifiers 112, multiple phase shifters 114, multiple second amplifiers 116, and an antenna array 118 that includes multiple antenna elements 120.

Transmission lines or other waveguides, wires, and/or traces are shown connecting the various components to illustrate how signals to be transmitted may travel between components. Reference numbers 122, 124, 126, and 128 indicate regions in the architecture 100 in which different types of signals travel or are processed. Specifically, reference number 122 indicates a region in which digital baseband signals travel or are processed, reference number 124 indicates a region in which analog baseband signals travel or are processed, reference number 126 indicates a region in which analog intermediate frequency (IF) signals travel or are processed, and reference number 128 indicates a region in which analog RF signals travel or are processed. The architecture 100 also includes a local oscillator A 130, a local oscillator B 132, and a controller/processor 134. It will be understood that this configuration is just an example. As another example, signals may be directly converted between baseband and RF (e.g., a frequency at which signals are transmitted or received over the air).

Each of the antenna elements 120 may include one or more sub-elements for radiating or receiving RF signals. For example, a single antenna element 120 may include a first sub-element cross-polarized with a second sub-element that can be used to independently transmit cross-polarized signals. The antenna elements 120 may include patch antennas, dipole antennas, or other types of antennas arranged in a linear pattern, a two dimensional pattern, or another pattern. A spacing between antenna elements 120 may be such that signals with a desired wavelength transmitted separately by the antenna elements 120 may interact or interfere (e.g., to form a desired beam). For example, given an expected range of wavelengths or frequencies, the spacing may provide a quarter wavelength, half wavelength, or other fraction of a wavelength of spacing between neighboring antenna elements 120 to allow for interaction or interference of signals transmitted by the separate antenna elements 120 within that expected range.

The modem 102 processes and generates digital baseband signals and may also control operation of the DAC 104, first and second mixers 106, 108, splitter 110, first amplifiers 112, phase shifters 114, and/or the second amplifiers 116 to transmit signals via one or more or all of the antenna elements 120. The modem 102 may process signals and control operation in accordance with a communication standard such as a wireless standard discussed herein. The DAC 104 may convert digital baseband signals received from the modem 102 (and that are to be transmitted) into analog baseband signals. The first mixer 106 upconverts analog baseband signals to analog IF signals within an IF using a local oscillator A 130. For example, the first mixer 106 may mix the signals with an oscillating signal generated by the local oscillator A 130 to "move" the baseband analog signals to the IF. In some cases, some processing or filtering (not shown) may take place at the IF. The second mixer 108 upconverts the analog IF signals to analog RF signals using the local oscillator B 132. Similar to the first mixer, the second mixer 108 may mix the signals with an oscillating signal generated by the local oscillator B 132 to "move" the IF analog signals to the RF or the frequency at which signals will be transmitted or received. The modem 102 and/or the controller/processor 134 may adjust the frequency of local oscillator A 130 and/or the local oscillator B 132 so that a desired IF and/or RF frequency is produced and used to facilitate processing and transmission of a signal within a desired bandwidth. The controller/processor 134 is illustrated as being coupled to the local oscillator C 170 and the local oscillator D 172, for example to adjust the frequencies of the local oscillator C 170 and/or the local oscillator D 172, but the controller/processor 134 may additionally or instead be coupled to the local oscillator A 130, the local oscillator B 132, the local oscillator C 170, and/or the local oscillator D 172. In other examples, the modem 102 is coupled to the local oscillator A 130 and/or the local oscillator B 132, and/or a connection from the controller/processor 134 to the local oscillator A 130, the local oscillator B 132, the local oscillator C 170, and/or the local oscillator D 172 is omitted.

In the illustrated architecture 100, signals upconverted by the second mixer 108 are split or duplicated into multiple signals by the splitter 110. The splitter 110 in architecture 100 splits the RF signal into multiple identical or nearly identical RF signals. In other examples, the split may take place with any type of signal, including with baseband digital, baseband analog, or IF analog signals. Each of these signals may correspond to an antenna element 120, and the signal travels through and is processed by amplifiers 112, 116, phase shifters 114, and/or other elements corresponding to the respective antenna element 120 to be provided to and transmitted by the corresponding antenna element 120 of the antenna array 118. In one example, the splitter 110 may be an active splitter that is connected to a power supply and provides some gain so that RF signals exiting the splitter 110 are at a power level equal to or greater than the signal entering the splitter 110. In another example, the splitter 110 is a passive splitter that is not connected to power supply and the RF signals exiting the splitter 110 may be at a power level lower than the RF signal entering the splitter 110.

After being split by the splitter 110, the resulting RF signals may enter an amplifier, such as a first amplifier 112, or a phase shifter 114 corresponding to an antenna element 120. The first and second amplifiers 112, 116 are illustrated with dashed lines because one or both of amplifiers 112, 116 might not be necessary in some aspects. In some aspects, both the first amplifier 112 and second amplifier 116 are present. In some aspects, neither the first amplifier 112 nor the second amplifier 116 is present. In some aspects, one of the two amplifiers 112, 116 is present but not the other. By way of example, if the splitter 110 is an active splitter, the first amplifier 112 may not be used. By way of further example, if the phase shifter 114 is an active phase shifter that can provide a gain, the second amplifier 116 might not be used.

The amplifiers 112, 116 may provide a desired level of positive or negative gain. A positive gain (positive dB) may be used to increase an amplitude of a signal for radiation by a specific antenna element 120. A negative gain (negative dB) may be used to decrease an amplitude and/or suppress radiation of the signal by a specific antenna element. Each of the amplifiers 112, 116 may be controlled independently (e.g., by the modem 102 or the controller/processor 134) to provide independent control of the gain for each antenna element 120. For example, the modem 102 and/or the controller/processor 134 may have at least one control line connected to each of the splitter 110, first amplifiers 112, phase shifters 114, and/or second amplifiers 116 that may be used to configure a gain to provide a desired amount of gain for each component and thus each antenna element 120.

The phase shifter 114 may provide a configurable phase shift or phase offset to a corresponding RF signal to be transmitted. The phase shifter 114 may be a passive phase shifter not directly connected to a power supply. Passive phase shifters might introduce some insertion loss. The second amplifier 116 may boost the signal to compensate for the insertion loss. The phase shifter 114 may be an active phase shifter connected to a power supply such that the active phase shifter provides some amount of gain or prevents insertion loss. The settings of each of the phase shifters 114 are independent, meaning that each can be independently set to provide a desired amount of phase shift or the same amount of phase shift or some other configuration. The modem 102 and/or the controller/processor 134 may have at least one control line connected to each of the phase shifters 114 and which may be used to configure the phase shifters 114 to provide a desired amount of phase shift or phase offset between antenna elements 120.

In the illustrated architecture 100, RF signals received by the antenna elements 120 are provided to one or more first amplifiers 156 to boost the signal strength. The first amplifiers 156 may be connected to the same antenna arrays 118 (e.g., for time division duplex (TDD) operations). The first amplifiers 156 may be connected to different antenna arrays 118. The boosted RF signal is input into one or more phase shifters 154 to provide a configurable phase shift or phase offset for the corresponding received RF signal to enable reception via one or more Rx beams. The phase shifter 154 may be an active phase shifter or a passive phase shifter. The settings of the phase shifters 154 are independent, meaning that each can be independently set to provide a desired amount of phase shift or the same amount of phase shift or some other configuration. The modem 102 and/or the controller/processor 134 may have at least one control line connected to each of the phase shifters 154 and which may be used to configure the phase shifters 154 to provide a desired amount of phase shift or phase offset between antenna elements 120 to enable reception via one or more Rx beams.

The outputs of the phase shifters 154 may be input to one or more second amplifiers 152 for signal amplification of the phase shifted received RF signals. The second amplifiers 152 may be individually configured to provide a configured amount of gain. The second amplifiers 152 may be individually configured to provide an amount of gain to ensure that the signals input to combiner 150 have the same magnitude. The amplifiers 152 and/or 156 are illustrated in dashed lines because they might not be necessary in some aspects. In some aspects, both the amplifier 152 and the amplifier 156 are present. In another aspect, neither the amplifier 152 nor the amplifier 156 are present. In other aspects, one of the amplifiers 152, 156 is present but not the other.

In the illustrated architecture 100, signals output by the phase shifters 154 (via the amplifiers 152 when present) are combined in combiner 150. The combiner 150 in architecture 100 combines the RF signal into a signal. The combiner 150 may be a passive combiner (e.g., not connected to a power source), which may result in some insertion loss. The combiner 150 may be an active combiner (e.g., connected to a power source), which may result in some signal gain. When combiner 150 is an active combiner, it may provide a different (e.g., configurable) amount of gain for each input signal so that the input signals have the same magnitude when they are combined.

When combiner 150 is an active combiner, the combiner 150 may not need the second amplifier 152 because the active combiner may provide the signal amplification.

The output of the combiner 150 is input into mixers 148 and 146. Mixers 148 and 146 generally down convert the received RF signal using inputs from local oscillators 172 and 170, respectively, to create intermediate or baseband signals that carry the encoded and modulated information. The output of the mixers 148 and 146 are input into an ADC 144 for conversion to digital signals. The digital signals output from ADC 144 are input to modem 102 for baseband processing, such as decoding, de-interleaving, or similar operations.

The architecture 100 is given by way of example only to illustrate an architecture for transmitting and/or receiving signals. In some cases, the architecture 100 and/or each portion of the architecture 100 may be repeated multiple times within an architecture to accommodate or provide an arbitrary number of RF chains, antenna elements, and/or antenna panels. Furthermore, numerous alternate architectures are possible and contemplated. For example, although only a single antenna array 118 is shown, two, three, or more antenna arrays may be included, each with one or more of their own corresponding amplifiers, phase shifters, splitters, mixers, DACs, ADCs, and/or modems. For example, a single UE may include two, four, or more antenna arrays for transmitting or receiving signals at different physical locations on the UE or in different directions or at different frequencies.

Furthermore, mixers, splitters, amplifiers, phase shifters and other components may be located in different signal type areas (e.g., represented by different ones of the reference numbers 122, 124, 126, 128) in different implemented architectures. For example, a split of the signal to be transmitted into multiple signals may take place at the analog RF, analog IF, analog baseband, or digital baseband frequencies in different examples. Similarly, amplification and/or phase shifts may also take place at different frequencies. For example, in some aspects, one or more of the splitter 110, amplifiers 112, 116, or phase shifters 114 may be located between the DAC 104 and the first mixer 106 or between the first mixer 106 and the second mixer 108. In one example, the functions of one or more of the components may be combined into one component. For example, the phase shifters 114 may perform amplification to include or replace the first and/or or second amplifiers 112, 116. By way of another example, a phase shift may be implemented by the second mixer 108 to obviate the need for a separate phase shifter 114. This technique is sometimes called local oscillator (LO) phase shifting. In some aspects of this configuration, there may be multiple IF to RF mixers (e.g., for each antenna element chain) within the second mixer 108, and the local oscillator B 132 may supply different local oscillator signals (with different phase offsets) to each IF to RF mixer.

The modem 102 and/or the controller/processor 134 may control one or more of the other components 104 through 172 to select one or more antenna elements 120 and/or to form beams for transmission of one or more signals. For example, the antenna elements 120 may be individually selected or deselected for transmission of a signal (or signals) by controlling an amplitude of one or more corresponding amplifiers, such as the first amplifiers 112 and/or the second amplifiers 116. Beamforming includes generation of a beam using multiple signals on different antenna elements, where one or more or all of the multiple signals are shifted in phase relative to each other. The formed beam may carry physical or higher layer reference signals or information. As each signal of the multiple signals is radiated from a respective antenna element 120, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 118) can be dynamically controlled by modifying the phase shifts or phase offsets imparted by the phase shifters 114 and amplitudes imparted by the amplifiers 112, 116 of the multiple signals relative to each other. The controller/processor 134 may be located partially or fully within one or more other components of the architecture 100. For example, the controller/processor 134 may be located within the modem 102 in some aspects.

As indicated above, FIG. 1 is provided as an example. Other examples may differ from what is described with regard to FIG. 1.

Figure 2:
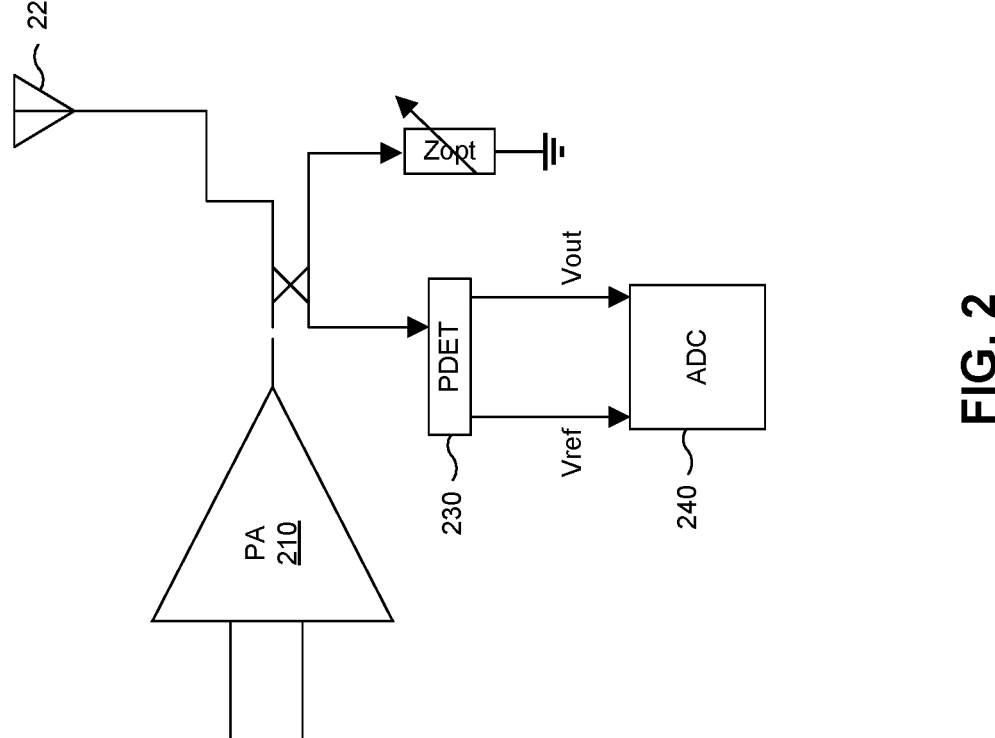
FIG. 2 is a diagram illustrating an example of a power detector circuit that may generate a signal indicating a power level of a transmit element in a phased array of a wireless transceiver, in accordance with the present disclosure.
Figure 2:
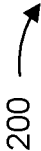

FIG. 2 is a diagram illustrating an example 200 of a power detector circuit that may generate a signal indicating a power level of a transmit element in a phased array of a wireless transceiver, in accordance with the present disclosure. For example, as shown in FIG. 2, each transmit element in the phased array includes a power amplifier 210 that drives a corresponding antenna element 220 in a phased array, and a power detector circuit 230 may be coupled to the output from the power amplifier 210. In some aspects, as described herein, the power detector circuit 230 is configured to generate a signal that indicates or represents how much power is being output by the power amplifier 210 such that information related to the power output by the power amplifier can be provided back to a modem to increase or decrease the TRP of the wireless transceiver in a servo manner (e.g., to prevent damage to the power amplifier 210, satisfy governmental or regulatory constraints, improve beamforming gain, or the like).

For example, to detect and control the output signal power by the power amplifier 210, the power detector circuit 230 may receive a sample of an RF transmit signal provided from the power amplifier 210 to the corresponding antenna element 220 (e.g., via a coupler or other suitable circuitry). The power detector circuit 230 may rectify and filter the sampled RF transmit signal to generate an analog signal, which may be a voltage or a current that is proportional to or otherwise indicative of the power level of the sampled RF signal at the output of the power amplifier 210. For example, as shown in FIG. 2, the power detector circuit 230 may generate a first voltage, Vout, that is proportional or otherwise indicative of the power level of the sampled RF signal at the output of the power amplifier 210. Accordingly, the first voltage may be provided to an ADC 240 along with a second (reference) voltage, Vref, such that the ADC 240 may generate a digital signal indicating the output power from the power amplifier 210. The digital signal generated by the ADC 240 may then be provided to a processor, a controller, a beamforming component, a modem, or another suitable device or circuit that may measure and adjust a TRP of the phased array system accordingly.

For example, a phased array system may include multiple power amplifiers 210 that are each driving a respective antenna element 220, where each power amplifier 210 may have a power detector circuit 230 and ADC 240 coupled to the output of the power amplifier 210. Accordingly, in a phased array system, one or more transmitters may be turned on simultaneously within a transmission time interval (TTI), such as a symbol, a slot, or the like, and the TRP of the phased array system may be configured (e.g., by the processor, controller, modem, or the like) according to an average output power over all of the transmit elements within the TTI. For example, in a phased array system with N power amplifiers 210, there may be N power detector circuits 230 that generate analog signals proportional to the power levels of sampled RF transmit signals at the respective output from each power amplifier 210, and N ADCs 240 that generate corresponding digital signals indicating the respective power levels output from each power amplifier 210. Accordingly, the digital signals generated by the N ADCs 240 may be provided to a processor, controller, modem, or the like, which may generate a detected power signal indicating or otherwise related to the TRP of the phased array system (e.g., the average output power over the N power amplifiers 210 within a TTI).

In some aspects, the detected power signal may then be used (e.g., by the processor, controller, modem, or the like) to control the respective gains of the N amplifiers 210 and/or the respective phase shifts of a set of phase shifters (e.g., Tx phase shifters 114). For example, the gains and phase shifts may be adjusted (e.g., increased or decreased) to control the TRP of the phased array system in order to prevent damage to the power amplifiers 210, to comply with governmental or other regulatory constraints, and/or to beamform a radiation pattern produced the phased array system such that a gain in a particular direction is substantially maximized or greater and/or such that a gain in other directions is substantially minimized. However, in the power detection topology shown in FIG. 2, the full power detection hardware is replicated for each power amplifier 210 and corresponding antenna element 220. Accordingly, the output voltage from the ADCs 240 (e.g., with values that are proportional to, equivalent to, indicative of, or otherwise representative of the voltage or current generated by the power detector circuits 230) is averaged across all the power amplifiers 210 and corresponding antenna elements 220 to set the TRP of the transceiver or transmitter (e.g., reducing power in cases where the measured TRP may cause damage to one or more power amplifiers 210 or fail to comply with governmental or regulatory limits). As a result, because the power detection hardware (e.g., the power detector circuit 230, ADC 240, and any associated circuitry, such as a coupler used to sample the RF transmit signal at the output of the power amplifier 210 and/or a grounded device associated with an optimum resistance, shown as Zopt in FIG. 2) is fully replicated for each transmit path, the power detection hardware tends to occupy significant area in the wireless transceiver or transmitter in addition to increasing device costs due to the large number of hardware elements needed to implement the power detection subsystem.

Accordingly, various aspects described herein relate to a power detection topology in which one or more power detection hardware elements that are typically replicated in each transmit path are shared among multiple transmit paths (e.g., multiple power amplifiers and corresponding antenna elements). In this way, the area that the power detection subsystem occupies within a wireless transceiver or transmitter may be significantly reduced, which may increase the area in the wireless transceiver or transmitter that is available for hardware elements supporting other efficiency enhancement techniques such as antenna tuning, power combining, or the like. Furthermore, because power detection hardware is often located adjacent to or near input/ output (I/O) hardware, a reduction in the area of the power detection hardware can allow for a reduction in a size of a chip that includes the power detection and I/O hardware. Furthermore, by sharing one or more hardware elements among multiple transmit paths, the total number of hardware elements forming the power detection subsystem is significantly reduced, which reduces device costs.

As indicated above, FIG. 2 is provided as an example. Other examples may differ from what is described with regard to FIG. 2.

Figure 3:
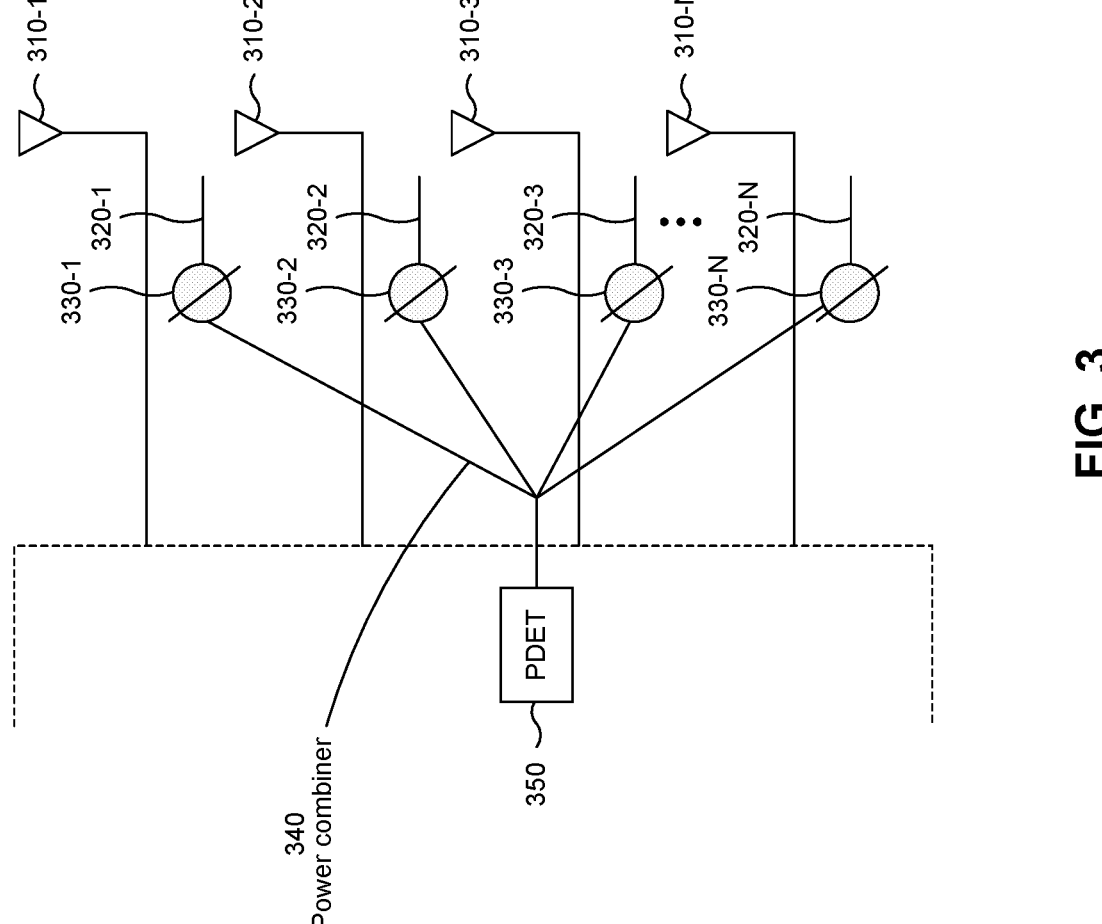
FIGS. 3-5 are diagrams illustrating examples of power detection topologies in which one or more power detection hardware elements are shared among multiple transmit paths, in accordance with the present disclosure.

FIG. 3 is a diagram illustrating an example 300 of a power detection topology in which one or more power detection hardware elements are shared among multiple transmit paths, in accordance with the present disclosure. As described herein, the power detection topology in FIG. 3 is provided for N transmit paths in a phased array, where each transmit path includes an antenna element 310 (shown as antenna elements 310-1 through 310-N) that is driven by a corresponding power amplifier (not explicitly shown in FIG. 3). For example, each antenna element 310 may be coupled to a respective power amplifier via an antenna connection path, which may include an on-chip antenna signal line (or antenna lead line), an off-chip antenna feed line, or a combination thereof (e.g., depending on a location of the corresponding antenna element 310 relative to the power amplifier). Each power amplifier receives an RF transmit signal to be amplified for transmission, where the RF transmit signal can be a phase-shifted version of a transmit signal that has been phase shifted by a respective phase shifter. Furthermore, each transmit path includes a respective coupler 320 (shown as couplers 320-1 through 320-N), where each coupler 320 senses power for an RF transmit signal along the antenna connection path. Accordingly, as described herein, a power detector circuit 350 may be shared among multiple antenna elements 310, rather than replicating a power detector circuit at the output of each power amplifier.

For example, when a coupler 320 senses a transmit power level for a respective antenna element 310, the sensed power level may be provided to a power combiner 340 as a sensed power indication signal. The power combiner 340 may combine the sensed power indication signals from the various couplers 320-1 through 320-N and generate a combined power indication that is provided to the power detector circuit 350. For example, as shown in FIG. 3, the power detector circuit 350 is coupled to the power combiner 340 via one or more lines. Accordingly, the power detector circuit 350 receives the combined power indication from the power combiner 340 (e.g., a Wilkinson power combiner), where the combined power indication represents a total output power associated with the N power amplifiers that drive the antenna elements 310-1 through 310-N. Furthermore, as shown in FIG. 3, the power detection topology includes an additional phase shifter 330 (shown as phase shifters 330-1 through 330-N) between the power combiner 340 and the coupler 320 in each transmit path. For example, the additional phase shifters 330-1 through 330-N may be provided to compensate for any phase shifting that was applied to the RF transmit signals sampled by the respective couplers 320 (e.g., to bring the various RF transmit signals in-phase such that the power combiner 340 can suitably combine the power levels).

Accordingly, although the power detection topology shown in FIG. 3 can be used to share the power detector circuit 350 among multiple transmit paths, the power detection topology shown in FIG. 3 has a significant area penalty due to the addition of the power combiner 340 and the phase shifters 330-1 through 330-N. Furthermore, implementing the power combiner 340 near transmission output bumps that provide connection points for the antenna elements 310-1 through 310-N poses significant challenges because the area near the transmission output bumps is typically the most or among the most crowded areas or regions in a wireless transceiver or transmitter.

As indicated above, FIG. 3 is provided as an example. Other examples may differ from what is described with regard to FIG. 3.

Figure 4:
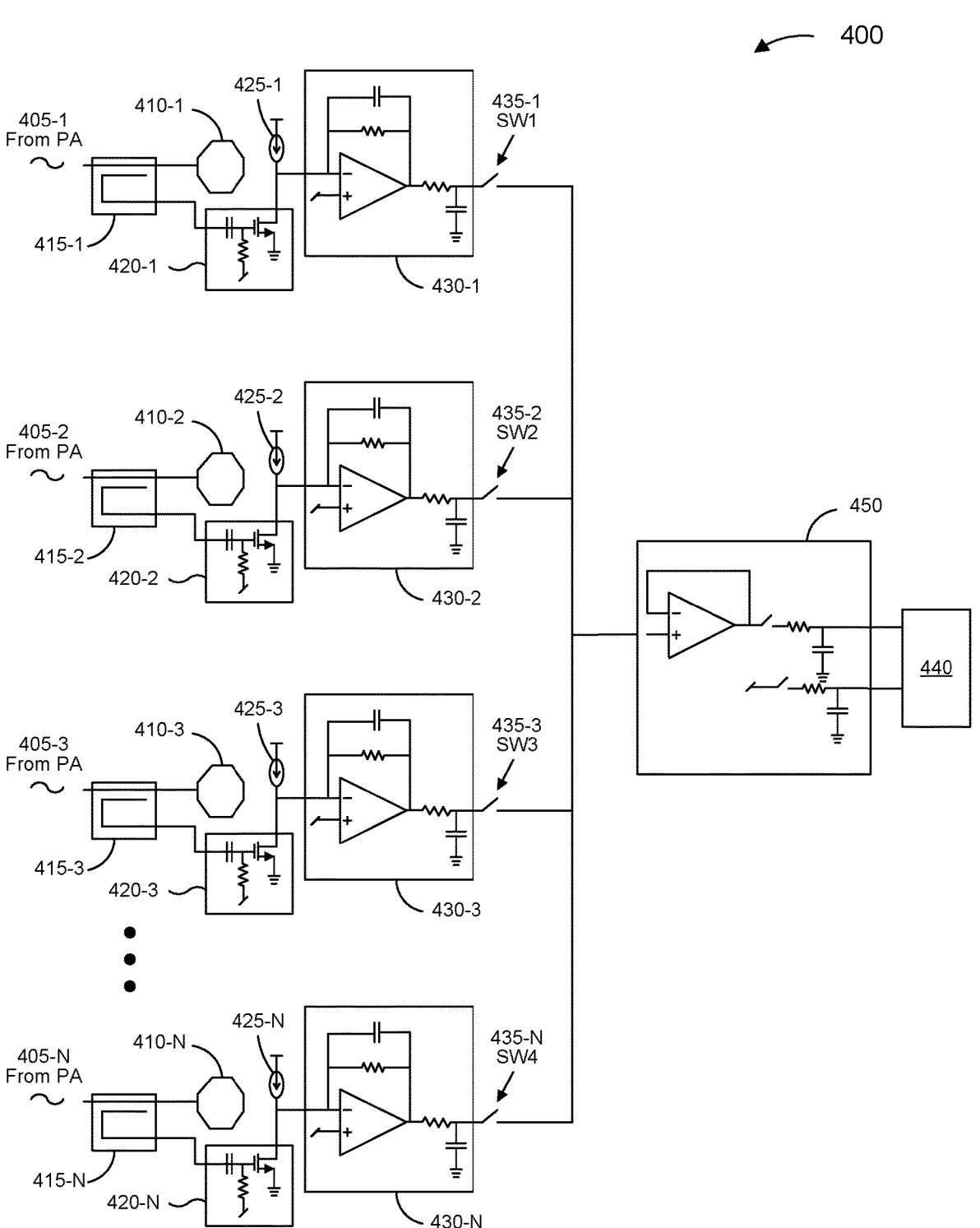

FIG. 4 is a diagram illustrating an example 400 of a power detection topology in which one or more power detection hardware elements are shared among multiple transmit paths, in accordance with the present disclosure. As described herein, the power detection topology in FIG. 4 is provided for N transmit paths in a phased array, where each transmit path includes a respective connection path 405 (shown as connection paths 405-1 through 405-N for the N transmit paths) from a respective power amplifier that is driving a corresponding antenna element. For example, as shown, each connection path 405 connects a power amplifier to a respective bump (shown as bumps 410-1 through 410-N for the N transmit paths) that represents a connection point or transition between an integrated circuit on which the depicted components are implemented and a corresponding antenna element (not explicitly shown in FIG. 4).

As further shown in FIG. 4, each transmit path further includes a coupler 415 (shown as couplers 415-1 through 415-N for the N transmit paths). For example, in some aspects, each coupler 415 is a directional coupler or other suitable device that can tap or sample a portion of the output power being provided from the power amplifier to the antenna element along the respective connection path 405. As further shown, each transmit path includes a squaring (or filtering) device 420 (shown as squaring devices 420-1 through 420-N for the N transmit paths), where the coupler 415 in each transmit path provides the tapped or sampled portion of the output power along the respective connection path 405 to the squaring device 420 in the respective transmit path. For example, in some aspects, the squaring device 420 may include one or more elements that are collectively biased according to a threshold, such that the squaring device 420 can generate a current proportional to the output power of the power amplifier in the respective transmit path. For example, as shown in FIG. 4, the squaring device 420 in each transmit path includes a resistor coupled between a capacitor and a field effect transistor (FET) that is coupled between ground and a respective current source 425 (shown current sources 425-1 through 425-N for the N transmit paths).

Accordingly, as further shown in FIG. 4, the current generated by the squaring device 420 in each transmit path may be provided to a TIA 430 (shown as TIAs 430-1 through 430-N for the N transmit paths), which may implement a low pass for the current provided by the squaring device 420. For example, as shown in FIG. 4, the TIA 430 in each transmit path includes an operational amplifier with a negative input terminal coupled between the current source 425 and the FET included in the squaring device 420, a positive input terminal that may be connected to a reference voltage generator (not shown in FIG. 4), and a resistor-capacitor (RC) feedback circuit that includes a feedback capacitor and a feedback resistor that are both coupled in parallel between the negative input terminal of the operational amplifier and an output terminal of the operational amplifier. As further shown, the TIA 430 includes a resistor with a first end coupled to the output terminal of the operational amplifier and a capacitor coupled between ground and a second end of the resistor. Accordingly, as described herein, the TIA 430 is configured to generate an analog signal (e.g., a voltage)

indicating the power level of the RF transmit signal of the associated transmit path based on the current provided by the squaring device 420.

As further shown in FIG. 4, each transmit path includes a switch 435 (shown as switches 435-1 through 435-N for the N transmit paths), which may be used to sequentially sample each transmit path within a transmit slot or TTI. For example, the power detection topology includes an ADC 440, which may be implemented in the same integrated circuit as the other components illustrated in FIG. 4 or in a different integrated circuit. In either case, the ADC 440 may be configured to sequentially scan all transmit paths and convert the analog signals generated by each transmit path into a digital signal. For example, within a transmit slot or TTI, switch 435-1 may be open and switches 435-2, 435-3, . . . , 435-N may be closed such that the ADC 440 can sample the analog signal generated by the first TIA 430-1, then switch 435-2 may be open and switches 435-1 and 435-3, . . . , 435-N may be closed such that the ADC 440 can sample the analog signal generated by the first TIA 430-2, and so on. Accordingly, the ADC 440 may sequentially sample the various analog signals within a transmit slot or TTI, and then average the analog signals in a digital domain to generate a digital signal that estimates the TRP associated with the N transmit paths. However, the power detection topology shown in FIG. 4 poses various challenges, including the need for an anti-aliasing filter 450 before the ADC 440 (e.g., to enable the sequential sampling of the various analog signals and the averaging in the digital domain). Furthermore, the power detection topology shown in FIG. 4 is associated with other limitations, such as increased latency (e.g., due to the digital averaging) and limited power accuracy.

As indicated above, FIG. 4 is provided as an example. Other examples may differ from what is described with regard to FIG. 4.

Figure 5:
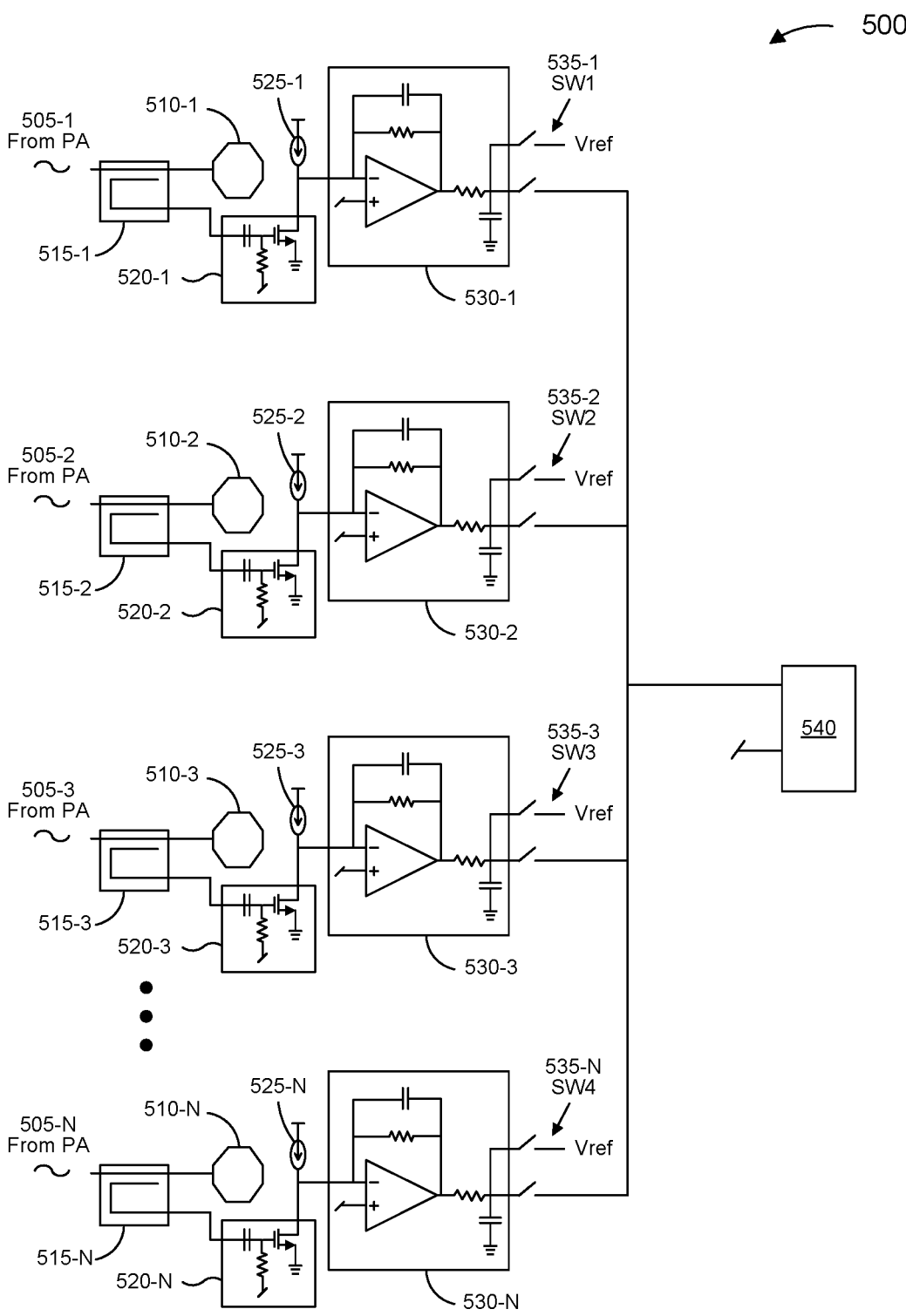

FIG. 5 is a diagram illustrating an example 500 of a power detection topology in which one or more power detection hardware elements are shared among multiple transmit paths, in accordance with the present disclosure. As described herein, the power detection topology in FIG. 5 is provided for N transmit paths in a phased array, where each transmit path includes a respective connection path 505 (shown as connection paths 505-1 through 505-N for the N transmit paths) from a respective power amplifier that is driving a corresponding antenna element. For example, as shown, each connection path 505 connects a power amplifier to a respective bump (shown as bumps 510-1 through 510-N for the N transmit paths) that represents a connection point or transition between an integrated circuit on which the depicted components are implemented and a corresponding antenna element (not explicitly shown in FIG. 5).

As further shown in FIG. 5, each transmit path further includes a coupler 515 (shown as couplers 515-1 through 515-N for the N transmit paths). For example, in some aspects, each coupler 515 is a directional coupler or other suitable device that can tap or sample a portion of the output power being provided from the power amplifier to the antenna element along the respective connection path 505. As further shown, each transmit path includes a squaring (or filtering) device 520 (shown as squaring devices 520-1 through 520-N for the N transmit paths), where the coupler 515 in each transmit path provides the tapped or sampled portion of the output power along the respective connection path 505 to the squaring device 520 in the respective transmit path. For example, in some aspects, the squaring device 520 may include one or more elements that are collectively biased according to a threshold, such that the squaring device 520 can generate a current proportional to the output power of the power amplifier in the respective transmit path. For example, as shown in FIG. 5, the squaring device 520 in each transmit path includes a resistor coupled between a capacitor and a FET that is coupled between ground and a respective current source 525 (shown current sources 525-1 through 525-N for the N transmit paths).

Accordingly, as further shown in FIG. 5, the current generated by the squaring device 520 in each transmit path may be provided to a TIA 530 (shown as TIAs 530-1 through 530-N for the N transmit paths), which may implement a low pass for the current provided by the squaring device 520. For example, as shown in FIG. 5, the TIA 530 in each transmit path includes an operational amplifier with a negative input terminal coupled between the current source 525 and the FET included in the squaring device 520, a positive input terminal that may be connected to a reference voltage generator (not shown in FIG. 5), and an RC feedback circuit that includes a feedback capacitor and a feedback resistor that are both coupled in parallel between the negative input terminal of the operational amplifier and an output terminal of the operational amplifier. As further shown, the TIA 530 includes a resistor with a first end coupled to the output terminal of the operational amplifier and a capacitor coupled between ground and a second end of the resistor. Accordingly, as described herein, the TIA 530 is configured to generate an analog signal (e.g., a voltage) indicating the power level of the RF transmit signal of the associated transmit path based on the current provided by the squaring device 520.

As further shown in FIG. 5, each transmit path includes a switch pair 535 (shown as switch pairs 535-1 through 535-N for the N transmit paths), where each switch pair 535 includes a first switch that is closed and coupled to a reference voltage, Vref, and a second switch that is open, when the corresponding antenna element is turned off. Alternatively, the second switch is closed and coupled to an input terminal of an ADC 540, and the first switch is open, when the corresponding antenna element is turned on. In this way, each switch pair 535 always includes one switch that is closed and one switch that is open, where the switch that is closed depends on whether the corresponding antenna element is turned on or turned off. In this way, the ADC 540 may sample waveforms representing the currents generated by the TIAs 530 associated with the multiple transmit paths only once per transmit slot or TTI in order to obtain the TRP from all of the transmit elements that are coupled to the ADC 540 (e.g., by performing analog averaging), which may be implemented in the same integrated circuit as the other components illustrated in FIG. 5 or in a different integrated circuit. In either case, relative to the power detection topology shown in FIG. 4, adding the first switch coupled to the reference voltage and using an always-on technique for the switch pairs 535 associated with each transmit path may reduce power estimation latency because the ADC 540 needs to sample a waveform only once to obtain the TRP of all of the transmit paths and there is no need for the ADC 540 to perform digital averaging. However, the area savings offered by the power detection topology shown in FIG. 5 is minimal relative to the power detection topology shown in FIG. 4, as the power detection topology shown in FIG. 5 eliminates only the need for an anti-aliasing filter before the ADC 540.

As indicated above, FIG. 5 is provided as an example. Other examples may differ from what is described with regard to FIG. 5.

Figure 6A:
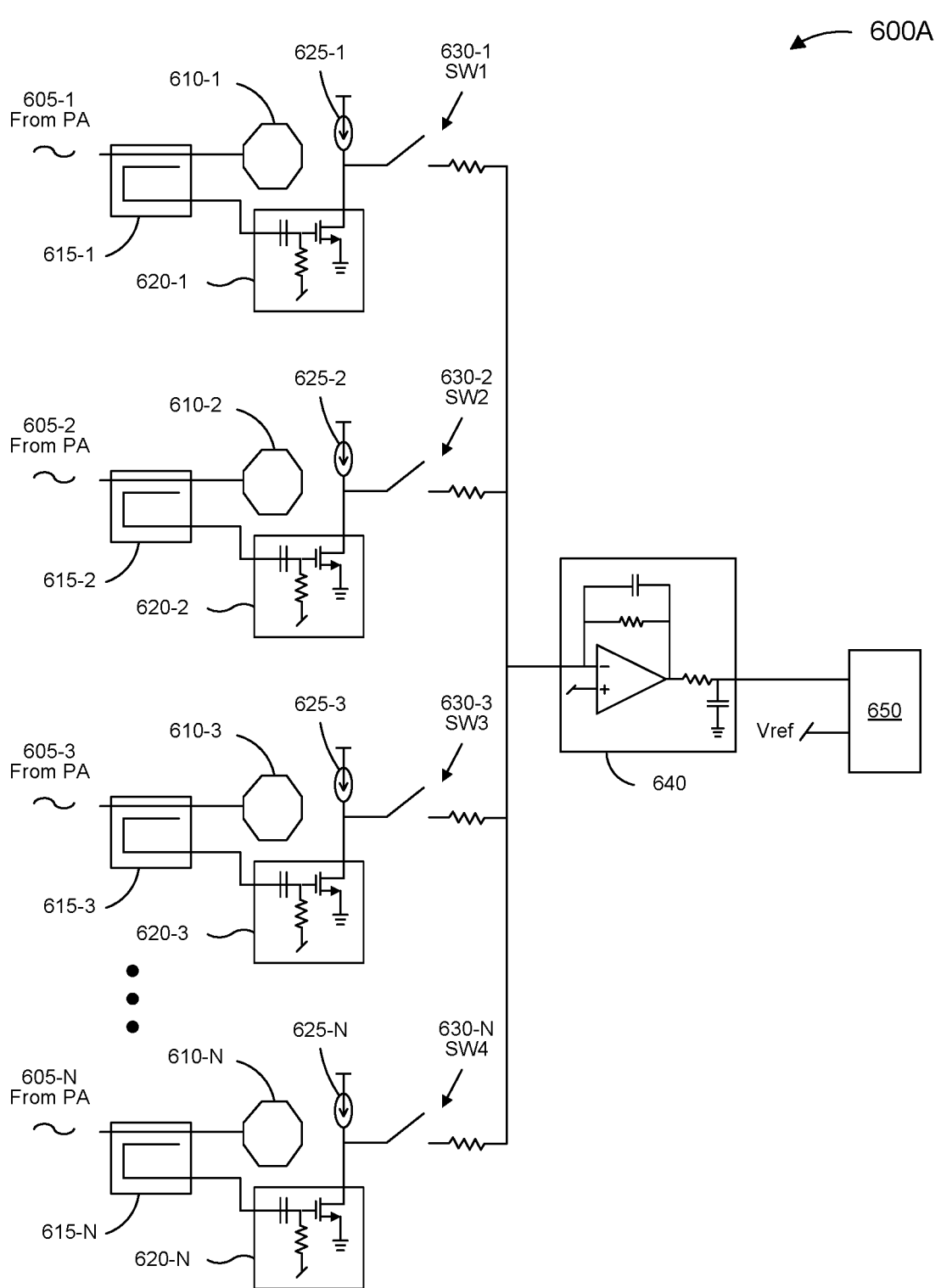
FIGS. 6A-6B are diagrams illustrating examples associated with an area-efficient power detection subsystem for a phased array transmitter, in accordance with the present disclosure.
Figure 6B:
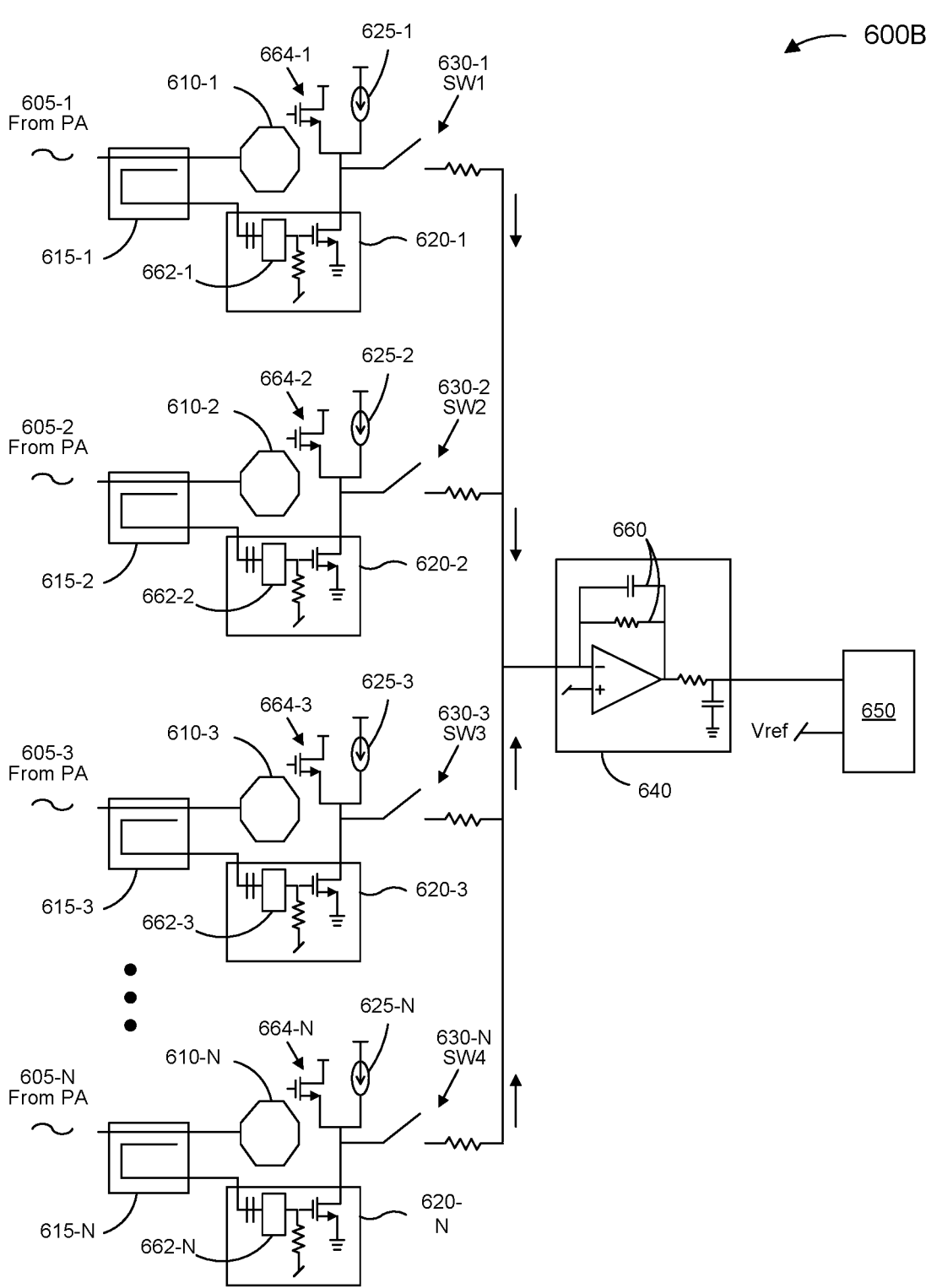

FIGS. 6A-6B are diagrams illustrating examples 600A, 600B associated with an area-efficient power detection subsystem for a phased array transmitter, in accordance with the present disclosure. As described herein, FIGS. 6A-6B illustrate a power detection topology that may be provided for N transmit paths in a phased array, where each transmit path includes a respective connection path 605 (shown as connection paths 605-1 through 605-N for the N transmit paths) from a respective power amplifier (e.g., the amplifier 116) that is driving a corresponding antenna element (e.g., the antenna element 120). For example, as shown, each connection path 605 connects a power amplifier to a respective bump (shown as bumps 610-1 through 610-N for the N transmit paths) that represents a connection point or transition between an integrated circuit on which the depicted components are implemented and a corresponding antenna element (not explicitly shown in FIGS. 6A-6B).

Accordingly, as shown in FIGS. 6A-6B and described herein, each transmit path includes a power coupling circuit that is coupled between a respective power amplifier and a respective antenna element in a phased array. For example, as shown in FIGS. 6A-6B, the power coupling circuit in each transmit path includes a coupler 615 (shown as couplers 615-1 through 615-N for the N transmit paths). For example, in some aspects, each coupler 615 is a directional coupler or other suitable device that can tap or sample a portion of the output power being provided from the power amplifier to the antenna element along the respective connection path 605. As further shown, each transmit path includes a squaring (or filtering) device 620 (shown as squaring devices 620-1 through 620-N for the N transmit paths), where the coupler 615 in each transmit path provides the tapped or sampled portion of the output power along the respective connection path 605 to the squaring device 620 in the respective transmit path. For example, in some aspects, the squaring device 620 may include one or more elements that are collectively biased according to a threshold, such that the squaring device 620 can generate a current proportional to the output power of the power amplifier in the respective transmit path. For example, as shown in FIGS. 6A-6B, the squaring device 620 in each transmit path includes a resistor coupled between a capacitor and a FET that is coupled between ground and a respective current source 625 (shown current sources 625-1 through 625-N for the N transmit paths). As further shown in FIGS. 6A-6B, each transmit path includes a switch 630 (shown as switches 630-1 through 630-N for the N transmit paths), where each switch 630 may be closed when the corresponding antenna element is turned on or open when the corresponding antenna element is turned off.

Accordingly, as further shown in FIGS. 6A-6B, the current generated by the squaring device 620 in each transmit path may be provided to a shared TIA 640 that is common to the multiple transmit paths and coupled to the power coupling circuits associated with each of the N transmit paths when the corresponding antenna element is turned on. For example, as described herein, the shared TIA 640 may implement a low pass for the currents provided by the squaring devices 620 associated with the N transmit paths, and may provide or otherwise output an analog signal indicating a summed value of the respective generated currents received from the power coupling circuits associated with the N transmit paths. For example, as shown in FIGS. 6A-6B, the shared TIA 640 includes an operational amplifier with a negative input terminal coupled to the outputs from the power coupling circuits associated with the N transmit paths, a positive input terminal that may be connected to a reference voltage generator (not shown in FIGS. 6A-6B), and an RC feedback circuit that includes a feedback capacitor and a feedback resistor that are both coupled in parallel between the negative input terminal of the operational amplifier and an output terminal of the operational amplifier. As further shown, the shared TIA 640 includes a resistor with a first end coupled to the output terminal of the operational amplifier and a capacitor coupled between ground and a second end of the resistor. Accordingly, as described herein, the shared TIA 640 is configured to generate an analog signal (e.g., a voltage) indicating a summed value of the respective generated currents received from the multiple power coupling circuits, which may be provided to an ADC 650 configured to provide a digital signal indicating the output powers from the power amplifiers associated with the N transmit paths based on the analog signal output by the shared TIA 640. In some aspects, the ADC 650 may be implemented in the same integrated circuit as the other components illustrated in FIGS. 6A-6B or in a different integrated circuit. Furthermore, because the squaring device 620 in each transmit path is configured to output a current proportional to the output power of the respective power amplifier, the phase of the sampled signal does not impact the value of the current, which can simply be low-pass filtered using the shared TIA 640.

Accordingly, relative to the power detection topologies shown in FIGS. 4-5, the power detection topology shown in FIGS. 6A-6B may extend power detection hardware sharing to an additional level. For example, the power detection topologies shown in FIGS. 4-5 each include a TIA per transmit path, where each TIA includes an operational amplifier and associated circuitry (e.g., one or more resistors and one or more capacitors). In this way, in an example implementation where the power detection topology shown in FIGS. 6A-6B is implemented multiple times (e.g., for each quadrant in a mmW IC, and/or such that each combination of a frequency range and a polarization is associated with a respective topology shown in FIGS. 6A-6B) and where N is four in this example, such that four transmit paths share a single TIA 640, three operational amplifiers, associated circuitry, and associated registers and calibrations can be eliminated per quadrant or combination. In other examples, N is five or another number. Furthermore, in a wireless transceiver or transmitter that includes multiple circuits (e.g., quads) that each implement the power detection topology shown in FIGS. 6A-6B, the hardware savings may be multiplied according to the number of circuits. For example, in a wireless transceiver or transmitter with 8 circuits that each include a power detection topology for 4 transmit paths, implementing the power detection topologies shown in FIGS. 4-5 would require 32 operational amplifiers and associated circuitry in one die along with the associated registers and calibrations. On the other hand, assuming the same configuration of a wireless transceiver or transmitter with 8 circuits that each include a power detection topology for 4 transmit paths, implementing the power detection topology shown in FIGS. 6A-6B would require only 8 operational amplifiers and associated circuitry (e.g., which may all be implemented on one die or IC, with one shared TIA 640 per circuit on the die or IC), which would eliminate 24 operational amplifiers and associated circuitry in one die along with the associated registers and calibrations. Furthermore, the power detection topology shown in FIGS. 6A-6B may be implemented in an front end IC (FEIC) configuration, for example such that all of the components illustrated in FIGS. 6A-6B are implemented on a single FEIC such as a mmW IC. In another example, in some aspects, the shared TIA 640 may be implemented in an FEIC, and the ADC 650 may be implemented in an intermediate frequency integrated circuit (IFIC) coupled to the FEIC. In such cases, the outputs from the power coupling circuits coupled to the shared TIA 640 may only generate analog outputs to be sent to the accompanying IFIC or up-conversion chip that carries mixed signal circuitry (e.g., the ADC 650 or the like).

In some aspects, in cases where there is only one antenna element that is turned on within a transmit slot or TTI, only current is generated and provided to the shared TIA 640. However, in cases where there are multiple antenna elements that are turned on within a transmit slot or TTI, multiple corresponding currents are generated and provided to the shared TIA 640. In other words, the current through the shared TIA 640 is proportional or related to the number of antenna elements that are turned on within a transmit slot or TTI. For example, if a single antenna element is turned on, a value of the current through the shared TIA 640 may be denoted $I_1$, and if M elements are simultaneously turned on simultaneously within the transmit slot or TTI, a value of the current through the shared TIA 640 may be denoted $M \times I_1$. In many cases, in a mmW transceiver or transmitter that supports beamforming, there may be multiple antenna elements simultaneously turned on in order to maximize gain in a particular direction (e.g., toward a wireless communication device intended to receive a transmitted signal). Accordingly, in order to maintain the output voltage from the shared TIA 640 within a suitable dynamic range, FIG. 6B depicts one or more examples of devices and/or techniques that may be used to scale the current through the shared TIA 640 per antenna element depending on the number of antenna elements that are turned on within a transmit slot or TTI.

For example, as shown by reference number 660, the gain through the shared TIA 640 may be dynamically adjusted by the RC feedback circuit that includes the feedback resistor and feedback capacitor coupled between the input of the operational amplifier and the output of the operational amplifier. For example, in cases where one antenna element is turned on, the feedback resistor may have a first resistance and the feedback capacitor may have a first capacitance value. Alternatively, in cases where multiple antenna elements are turned on, the feedback resistor may have a second (e.g., lower) resistance and/or the capacitance of the feedback capacitor may be adjusted accordingly to regulate the value of the voltage at the output of the shared TIA 640. For example, in some aspects, the feedback resistor and/or the feedback capacitor may be adjustable such that the resistance and capacitance can be set to an appropriate value (e.g., according to the number of antenna elements that are turned on). In another example, the feedback resistor may be included in a resistor bank and/or the feedback capacitor may be included in a capacitor bank such that the feedback resistor and/or feedback capacitor with the appropriate resistance and/or capacitance values can be selected from the resistor bank and/or the capacitor bank. Additionally, or alternatively, the power coupling circuit associated with each transmit path may include an input attenuator 662 (shown as input attenuator 662-1 through 662-N for the N transmit paths) that may be provided within the respective squaring device 620 to scale the current from the respective antenna element. For example, in some aspects, a processor, controller, or other device may determine how many antenna elements are turned on or off in a current transmit slot or TTI, and may configure the respective input attenuators 662 to add a number of decibels (dB) of attenuation based on the number of antenna elements that are turned on or off in the current transmit slot or TTI. Additionally, or alternatively, the power coupling circuit associated with each transmit path may include a device 664 (shown as FETs 664-1 through 644-N for the N transmit paths) that may be configured to bleed away current from the respective antenna element (e.g., to Vdd) to reduce the current that is provided to the shared TIA 640 based on the number of antenna elements that are turned on or off in the current transmit slot or TTI.

As indicated above, FIGS. 6A-6B are provided as examples. Other examples may differ from what is described with regard to FIGS. 6A-6B.

FIG. 7 is a flowchart of an example process 700 associated with an area-efficient power detection subsystem for a phased array transmitter. In some implementations, a power detection subsystem (e.g., the power detection subsystem shown in FIGS. 6A-6B) may perform or may be configured to perform the process 700. In some implementations, another device or a group of devices separate from or including the power detection subsystem (e.g., a processor, a controller, or the like) may perform or may be configured to perform the process 700. Additionally, or alternatively, one or more components of the power detection subsystem may perform or may be configured to perform the process 700. Thus, means for performing the process 700 may include the power detection subsystem and/or one or more components of the power detection subsystem.

As shown in FIG. 7, the process 700 may include generating, by each of multiple power coupling circuits that are coupled between a respective power amplifier and a respective antenna element in a phased array, a current proportional to an output power of the respective power amplifier (block 710). As further shown in FIG. 7, the process 700 may include receiving, at an input of a shared TIA coupled to the multiple power coupling circuits, the respective generated currents (block 720). As further shown in FIG. 7, the process 700 may include providing, by the shared TIA, an analog signal indicating a value of the respective generated currents received from the multiple power coupling circuits (block 730). As further shown in FIG. 7, the process 700 may include providing, by an ADC comprising an input coupled to an output from the shared TIA, a digital signal indicating the output powers from the power amplifiers based on the analog signal provided by the shared TIA (block 740).

The process 700 may include additional aspects, such as any single aspect or any combination of aspects described below and/or described in connection with one or more other processes or operations described elsewhere herein.

In a first aspect, the multiple power coupling circuits each comprise a coupler that includes an input coupled to the respective power amplifier, a first output coupled to the respective antenna element associated with the power coupling circuit, and a second output coupled to the shared TIA.

In a second aspect, alone or in combination with the first aspect, the multiple power coupling circuits each further comprise a squaring device, coupled between the shared TIA and the second output of the coupler, to output the current proportional to the output power of the respective power amplifier.

In a third aspect, alone or in combination with one or more of the first and second aspects, the multiple power coupling circuits each further comprise a switching device, coupled between the shared TIA and the squaring device, that is closed, such that the current output by the squaring device is provided to the shared TIA, when the respective antenna element is on.

In a fourth aspect, alone or in combination with one or more of the first through third aspects, the shared TIA is implemented in an FEIC, and the ADC is implemented in an IFIC coupled to the FEIC.

In a fifth aspect, alone or in combination with one or more of the first through fourth aspects, a current through the shared TIA is proportional to a number of the antenna elements that are turned on.

In a sixth aspect, alone or in combination with one or more of the first through fifth aspects, the process 700 includes adjusting, by an RC feedback circuit coupled between the input of the shared TIA and an output of the shared TIA, a gain of the shared TIA.

In a seventh aspect, alone or in combination with one or more of the first through sixth aspects, the process 700 includes scaling, by respective input attenuators included in the multiple power coupling circuits, current from the respective antenna element.

In an eighth aspect, alone or in combination with one or more of the first through seventh aspects, the process 700 includes bleeding away, the multiple power coupling circuits, current from the respective antenna element to reduce the current provided to the shared TIA.

Although FIG. 7 shows example blocks of a process 700, in some implementations, the process 700 may include additional blocks, fewer blocks, different blocks, or differently arranged blocks than those depicted in FIG. 7. Additionally, or alternatively, two or more of the blocks of the process 700 may be performed in parallel. The process 700 is an example of one process that may be performed by one or more devices described herein. These one or more devices may perform or may be configured to perform one or more other processes based on operations described herein.

The following provides an overview of some Aspects of the present disclosure:

Aspect 1: An apparatus, comprising: multiple power coupling circuits that are each coupled between a respective power amplifier and a respective antenna element in a phased array, each power coupling circuit configured to generate a current proportional to an output power of the respective power amplifier; a shared TIA coupled to the multiple power coupling circuits, wherein the shared TIA comprises: an input to receive, from the multiple power coupling circuits, the respective generated currents; and an output to provide an analog signal indicating a value of the respective generated currents received from the multiple power coupling circuits; and an ADC that comprises an input coupled to the output from the shared TIA and an output configured to provide a digital signal indicating the output powers from the power amplifiers.

Aspect 2: The apparatus of Aspect 1, wherein the multiple power coupling circuits each comprise a coupler that includes an input coupled to the respective power amplifier, a first output coupled to the respective antenna element associated with the power coupling circuit, and a second output coupled to the shared TIA.

Aspect 3: The apparatus of Aspect 2, wherein the multiple power coupling circuits each further comprise a squaring device, coupled between the shared TIA and the second output of the coupler, to output the current proportional to the output power of the respective power amplifier.

Aspect 4: The apparatus of Aspect 3, wherein the multiple power coupling circuits each further comprise a switching device, coupled between the shared TIA and the squaring device, that is closed, such that the current output by the squaring device is provided to the shared TIA, when the respective antenna element is on.

Aspect 5: The apparatus of any of Aspects 1-4, wherein the shared TIA is implemented in an FEIC, and wherein the ADC is implemented in an IFIC coupled to the FEIC.

Aspect 6: The apparatus of any of Aspects 1-5, wherein a current through the shared TIA is proportional to a number of the antenna elements that are turned on.

Aspect 7: The apparatus of any of Aspects 1-6, further comprising: an RC feedback circuit, coupled between an input of the shared TIA and an output of the shared TIA, to adjust a gain of the shared TIA.

Aspect 8: The apparatus of any of Aspects 1-7, wherein the multiple power coupling circuits each comprise an input attenuator to scale current from the respective antenna element.

Aspect 9: The apparatus of any of Aspects 1-8, wherein the multiple power coupling circuits each comprise one or more devices to bleed away current from the respective antenna element to reduce the current provided to the shared TIA.

Aspect 10: A method, comprising: generating, by each of multiple power coupling circuits that are coupled between a respective power amplifier and a respective antenna element in a phased array, a current proportional to an output power of the respective power amplifier; receiving, at an input of a shared TIA coupled to the multiple power coupling circuits the respective generated currents; providing, by the shared TIA, an analog signal indicating a value of the respective generated currents received from the multiple power coupling circuits; and providing, by an ADC coupled to an output from the shared TIA, a digital signal indicating the output powers from the power amplifiers based on the analog signal provided by the shared TIA.

Aspect 11: The method of Aspect 10, wherein the multiple power coupling circuits each comprise a coupler that includes an input coupled to the respective power amplifier, a first output coupled to the respective antenna element associated with the power coupling circuit, and a second output coupled to the shared TIA.

Aspect 12: The method of Aspect 11, wherein the multiple power coupling circuits each further comprise a squaring device, coupled between the shared TIA and the second output of the coupler, to output the current proportional to the output power of the respective power amplifier.

Aspect 13: The method of Aspect 12, wherein the multiple power coupling circuits each further comprise a switching device, coupled between the shared TIA and the squaring device, that is closed, such that the current output by the squaring device is provided to the shared TIA, when the respective antenna element is on.

Aspect 14: The method of any of Aspects 10-13, wherein the shared TIA is implemented in an FEIC, and wherein the ADC is implemented in an IFIC coupled to the FEIC.

Aspect 15: The method of any of Aspects 10-14, wherein a current through the shared TIA is proportional to a number of the antenna elements that are turned on.

Aspect 16: The method of any of Aspects 10-15, further comprising: adjusting, by an RC feedback circuit coupled between the input of the shared TIA and an output of the shared TIA, a gain of the shared TIA.

Aspect 17: The method of any of Aspects 10-16, further comprising: scaling, by respective input attenuators included in the multiple power coupling circuits, current from the respective antenna element.

Aspect 18: The method of any of Aspects 10-17, further comprising: bleeding away, the multiple power coupling circuits, current from the respective antenna element to reduce the current provided to the shared TIA.

Aspect 19: An apparatus, comprising: a plurality of power coupling means, each provided between a respective power amplifier and a respective antenna element in a phased array, for generating a current proportional to an output power of the respective power amplifier; means for providing an analog signal indicating a value of the respective generated currents, wherein the means for providing the analog signal is shared by the plurality of power coupling means; and means for providing a digital signal indicating the output powers from the power amplifiers based on the analog signal.

Aspect 20: The apparatus of Aspect 19, further comprising: means for adjusting a gain of the means for providing the analog signal.

Aspect 21: A system configured to perform one or more operations recited in one or more of Aspects 1-20.

Aspect 22: An apparatus comprising means for performing one or more operations recited in one or more of Aspects 1-20.

Aspect 23: A non-transitory computer-readable medium storing a set of instructions, the set of instructions comprising one or more instructions that, when executed by a device, cause the device to perform one or more operations recited in one or more of Aspects 1-20.

Aspect 24: A computer program product comprising instructions or code for executing one or more operations recited in one or more of Aspects 1-20.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus, comprising:
multiple power coupling circuits that are each coupled between a respective power amplifier and a respective antenna element in a phased array, each power coupling circuit configured to generate a current proportional to an output power of the respective power amplifier;
a shared transimpedance amplifier (TIA) coupled to the multiple power coupling circuits, wherein the shared TIA comprises:
an input to receive, from the multiple power coupling circuits, the respective generated currents; and
an output to provide an analog signal indicating a value of the respective generated currents received from the multiple power coupling circuits; and
an analog-to-digital converter (ADC) that comprises an input coupled to the output from the shared TIA and an output configured to provide a digital signal indicating the output powers from the power amplifiers.

2. The apparatus of claim 1, wherein the multiple power coupling circuits each comprise a coupler that includes an input coupled to the respective power amplifier, a first output coupled to the respective antenna element associated with the power coupling circuit, and a second output coupled to the shared TIA.

3. The apparatus of claim 2, wherein the multiple power coupling circuits each further comprise a squaring device, coupled between the shared TIA and the second output of the coupler, to output the current proportional to the output power of the respective power amplifier.

4. The apparatus of claim 3, wherein the multiple power coupling circuits each further comprise a switching device, coupled between the shared TIA and the squaring device, that is closed, such that the current output by the squaring device is provided to the shared TIA, when the respective antenna element is on.

5. The apparatus of claim 1, wherein the shared TIA is implemented in a front-end integrated circuit (FEIC), and wherein the ADC is implemented in an intermediate frequency integrated circuit (IFIC) coupled to the FEIC.

6. The apparatus of claim 1, wherein a current through the shared TIA is proportional to a number of the antenna elements that are turned on.

7. The apparatus of claim 1, further comprising:

a resistor-capacitor (RC) feedback circuit, coupled between an input of the shared TIA and an output of the shared TIA, to adjust a gain of the shared TIA.

8. The apparatus of claim 1, wherein the multiple power coupling circuits each comprise an input attenuator to scale current from the respective antenna element.

9. The apparatus of claim 1, wherein the multiple power coupling circuits each comprise one or more devices to bleed away current from the respective antenna element to reduce the current provided to the shared TIA.

10. A method, comprising:

generating, by each of multiple power coupling circuits that are coupled between a respective power amplifier and a respective antenna element in a phased array, a current proportional to an output power of the respective power amplifier;

receiving, at an input of a shared transimpedance amplifier (TIA) coupled to the multiple power coupling circuits the respective generated currents;

providing, by the shared TIA, an analog signal indicating a value of the respective generated currents received from the multiple power coupling circuits; and providing, by an analog-to-digital converter (ADC) coupled to an output from the shared TIA, a digital signal indicating the output powers from the power amplifiers based on the analog signal provided by the shared TIA.

11. The method of claim 10, wherein the multiple power coupling circuits each comprise a coupler that includes an input coupled to the respective power amplifier, a first output coupled to the respective antenna element associated with the power coupling circuit, and a second output coupled to the shared TIA.

12. The method of claim 11, wherein the multiple power coupling circuits each further comprise a squaring device, coupled between the shared TIA and the second output of the coupler, to output the current proportional to the output power of the respective power amplifier.

13. The method of claim 12, wherein the multiple power coupling circuits each further comprise a switching device, coupled between the shared TIA and the squaring device, that is closed, such that the current output by the squaring device is provided to the shared TIA, when the respective antenna element is on.

14. The method of claim 10, wherein the shared TIA is implemented in a front-end integrated circuit (FEIC), and wherein the ADC is implemented in an intermediate frequency integrated circuit (IFIC) coupled to the FEIC.

15. The method of claim 10, wherein a current through the shared TIA is proportional to a number of the antenna elements that are turned on.

16. The method of claim 10, further comprising:

adjusting, by a resistor-capacitor (RC) feedback circuit coupled between the input of the shared TIA and an output of the shared TIA, a gain of the shared TIA.

17. The method of claim 10, further comprising:

scaling, by respective input attenuators included in the multiple power coupling circuits, current from the respective antenna element.

18. The method of claim 10, further comprising:

bleeding away, by the multiple power coupling circuits, current from the respective antenna element to reduce the current provided to the shared TIA.

* * * * *